Patented Aug. 23, 1949

2,480,075

UNITED STATES PATENT OFFICE 2,480,075

PROCESS FOR RECOVERING PENICILLIN

George F. Cartland, Kalamazoo, Mich., assignor to The Upjohn Company, Kalamazoo, Mich., a corporation of Michigan No Drawing. Application January 6, 1945, Serial No. 571,667

6 Claims. (Cl. 260—302)

This invention relates to a process for the recovery of penicillin and more particularly to a process for the recovery of penicillin from a brew formed by fermentation of an aqueous medium with a penicillin-producing mold.

The production of penicillin is accomplished by the fermentation of an aqueous medium with a microorganism, such as *Penicillium notatum*, *Penicillium chrysogenum*, or other members of the *Penicillium chrysogenum* series of molds. Representative strains are *Penicillium notatum* (NRRL strain No. 832) and *Penicillium chrysogenum* (NRRL strain No. 1951). The fermentation is usually carried out in one of two ways designated in the art as the "bottle" process and the "submerged fermentation" process, respectively. In the first or bottle process the medium is placed in shallow layers in flasks or bottles and the layer inoculated on the surface with a pure culture of the mold. The flask is allowed to stand under controlled conditions for several days without agitating the liquid, after which the thick mat or mold growth which forms on the surface of the liquid is removed and liquid itself clarified and worked up for the recovery of penicillin.

In the submerged fermentation process an aqueous medium favorable to the growth of the penicillin-producing microorganism is inoculated with the organism and the mixture stirred and aerated, preferably with sterile air, for several days under carefully controlled conditions of temperature. The mixture of liquid and suspended organism, which has the consistency of a thin batter, is clarified, e. g. by adding a filter aid and filtering, and penicillin recovered from the clarified liquid. Although both methods are used commercially, the submerged fermentation process is of particular value due to the fact that the mixture of organism and medium may be handled in large quantities in vats or other suitable vessels by conventional methods used in transferring, agitating and otherwise handling liquids. The submerged fermentation process has been developed to the point where the fermentation brew may after clarification contain considerably more than 100 Oxford units of penicillin per milliliter of brew.

The recovery of penicillin from the fermentation brew obtained by either process has however presented certain difficulties which have not heretofore been overcome. It has been difficult if not impossible to recover penicillin from such brews in high yield and in a state of high purity, as measured by its activity per unit weight, by previously described commercially practical recovery processes. The recovery process which has probably been used to the greatest extent consists in first clarifying the brew by adding a filter aid such as porous clay and filtering. The clarified brew contains about 90% of the penicillin in the original unclarified brew. The clarified brew is then stirred with activated carbon which adsorbs most of the penicillin from the brew. The mixture is then filtered and the carbon filter cake containing penicillin is extracted with a mixture of water and sufficient amyl acetate to substantially saturate the water. The extract is chilled, acidified with phosphoric acid and extracted with amyl acetate.

These steps of the process are unsatisfactory for a number of reasons. The extraction of penicillin from the wet activated carbon is accompanied by the formation of mixtures extremely difficult to filter and a great deal of time is consumed in this operation. When the filtrate from the carbon is extracted with amyl acetate much difficulty is experienced due to the formation of emulsions and thick creamy mixtures which do not separate readily into layers. Furthermore, the activated carbon adsorbs not only penicillin from the brew but also proteins and enzymic substances, the latter of which promote decomposition of penicillin. These enzymic substances are also present during the subsequent extraction with amyl acetate and continue their deleterious effect on penicillin at this stage in process. Usually not more than from about 45 to 50 percent of the activity due to penicillin in the clarified brew is present in the aqueous amyl acetate extract from the activated carbon and further losses are encountered during the subsequent extraction of this liquid.

One method of recovering penicillin from the amyl acetate extract consists in washing the extract with sufficient of a dilute aqueous alkali, such as aqueous sodium bicarbonate or aqueous potassium hydroxide to raise the pH of the mixture to about 7. The mixture is allowed to separate into layers and the aqueous layer, which in commercial practice contains from thirty to forty-five percent of the original activity of the clarified brew, is separated from the amyl acetate and concentrated or dried to form the final penicillin-containing product. The dry product usually contains not more than from about 200 to about 300 Oxford units of penicillin per milligram.

It is thus apparent that the heretofore known methods of recovering penicillin from brews obtained by fermentation as well as from other dilute enzyme-containing solutions thereof regardless of their origin, permit of the actual recovery under optimum conditions of not more than about fifty percent, and usually of considerably less, of the penicillin actually present in the brew or solution, and that the product obtained has a low degree of purity as measured by its activity per unit weight. Since the concentration of penicillin in clarified fermentation brews is small even under optimum conditions of growth of the organism, it is apparent that any improvement which will permit of a recovery of a higher proportion of the penicillin, or of obtaining it in a state of higher purity, will be of great value.

It is therefore an object of the present invention to provide a method for the recovery of penicillin from dilute solutions thereof containing penicillin-destroying enzymes. An additional object is to provide a method for the recovery of penicillin from a fermentation brew whereby a high proportion of the penicillin present in the brew may be obtained in the form of a product having a high degree of activity. An additional object is to provide a method for recovering penicillin from a brew produced by fermentation with a penicillin-producing mold free from many of the operating difficulties inherent in heretofore known methods. An additional object is to provide a method for the production of penicillin by fermentation with a member of the *Penicillin chrysogenum* series wherein the recovery of penicillin formed during the fermentation may be effected readily and rapidly. An additional object is to provide a method for producing a dry penicillin-containing product having a high degree of activity.

These and related objects are accomplished readily by adding sufficient acetone to the brew or dilute enzyme-containing aqueous solution of penicillin to precipitate protein and enzymic material contained therein. The brew may be clarified prior to the addition of the acetone, if desired, although such clarification is not essential. The mixture is then filtered to remove insoluble substances and acetone is distilled from the filtrate preferably under reduced pressure. In this way a clear aqueous solution is obtained containing substantially all of the penicillin present in the original fermentation brew. This clear liquid is substantially free of enzymic substances which destroy penicillin.

Penicillin may be recovered readily from the clear aqueous solution obtained in this manner by mixing it with a water-immiscible organic liquid in which penicillin is soluble, chilling, agitating and acidifying the mixture and allowing it to separate into layers. The layer of organic liquid, which contains substantially all of the penicillin present in the original brew is then extracted with sufficient of a dilute aqueous alkali, such as sodium hydroxide or sodium bicarbonate, to raise the pH of the mixture to about 7 and the penicillin thus obtained in the form of an aqueous solution of its sodium salt. The aqueous solution so obtained usually contains from 75 to 90 percent of the penicillin present in the original unclarified fermentation brew. The clear solution of the sodium salt of penicillin may be concentrated or dried under conditions suitable for the production of a pharmaceutically useful product. The dry penicillin-containing substance so obtained is of high purity and usually contains from 500 to 800 Oxford units of penicillin per milligram.

Alternatively the aqueous substantially neutral solution of penicillin obtained by extracting penicillin from the water-immiscible organic liquid with a dilute alkali or, if desired, with a buffered solution, e. g. with a phosphate buffered solution having a pH of about 7, may in turn be extracted with a water-immiscible organic liquid under conditions of acidity and temperature similar to those maintained during the extraction of the still residue previously described. The solution of penicillin in the organic liquid thus obtained may then be extracted as before with an aqueous solution containing sufficient alkali to raise the pH of the mixture to about 7 and the resulting aqueous solution of soluble salt of penicillin concentrated or dried. This alternative procedure leads to several desirable results. The volume of penicillin-containing organic liquid may be reduced materially over that resulting from the first extraction of the still residue, as is apparent from the appended Example 3, and this leads to easy recovery of a higher proportion of the penicillin contained therein with the use of a relatively small volume of aqueous alkali. Furthermore, a certain amount of purification of the penicillin is effected during the procedure so that a dried product containing as high as from 500 to 800 Oxford units of penicillin per milligram may be obtained readily.

The process of the invention is valuable for a number of reasons. In addition to the high proportion of penicillin which may be recovered and to the state of high purity of the product, the process is economical in that there is little or no waste of activated carbon or of other valuable products such as occurs in conventional recovery processes heretofore available. Furthermore, the process of the invention may be carried out rapidly and easily since little or no difficulty is experienced due to the formation of emulsions or mixtures difficult to separate or filter. The high initial concentration of acetone precipitates protein material and serves effectively to immobilize or inactivate enzymic substances present in the fermentation brew so there is little or no destruction of the penicillin by the action of these substances. A separate preliminary clarification step of the brew prior to the addition of acetone is not necessary and this saving of one step in the process is advantageous since from 5 to 10 per cent of the penicillin in the brew may be lost during clarification.

In carrying out the process the brew may, if desired, be strained prior to the addition of acetone to remove large masses of mold, such as are present following fermentation according to the bottle process, although clarification to even this extent is not essential. Sufficient acetone to inactivate penicillin-destroying enzymes contained in the brew, preferably from one to two volumes of acetone for each volume of brew, is added to the brew and the mixture stirred thoroughly. A filter aid, such as Supercel (a diatomaceous earth) is added and the mixture filtered. The residue is discarded and the filtrate which contains from about 50 to 66 per cent by volume of acetone is distilled, e. g. under reduced pressure or by flash distillation methods, until substantially all of the acetone has been removed. The distillation should be carried out in such manner that the penicillin-containing portion of the mixture is not heated to high enough a temperature or sufficiently long to cause decomposition of penicillin contained therein. The distillation is preferably carried out under reduced pressure at a temperature of about 45° C. or lower.

After the acetone has been distilled from the mixture, the still residue, which has a volume approximately equal to that of the original brew, is chilled to from 0° to about 5° C., agitated with a water-immiscible organic liquid in which penicillin is soluble, and the mixture acidified, e. g. with phosphoric acid, to a pH of from about 1.8 to about 2.5. In carrying out the extraction, it is preferable, as will be explained later, to use an organic liquid having a boiling point below about 140° C. Suitable liquids include carbon tetrachloride, ethylene dichloride, trichloroethylene, chloroform, methylene chloride, ethyl acetate, ethyl ether, and many others. Aromatic hydrocarbons are usually not suitable due to the low solubility therein of penicillin. Esters, such as ethyl acetate, butyl acetate and ethyl propionate, may be used if desired although they are not preferred due to their tendency to hydrolyze in aqueous mixture and due to their tendency to form mixtures which separate into layers only slowly. Satisfactory results have been obtained by extracting the chilled still residue with three successive portions of ethylene dichloride, each having a volume of about 10 per cent of that of the still residue. Acidification is preferably accomplished while agitating the mixture of still residue and first portion of ethylene dichloride.

Penicillin is then extracted from the organic liquid with an aqueous solution containing sufficient of an alkali, e. g. sodium bicarbonate or sodium hydroxide, to maintain the pH of the mixture at not to exceed about 7. The extraction is carried out conveniently using three successive portions of the aqueous solution each having a volume of about 10 per cent of that of the ethylene dichloride. Care should be exercised to prevent the pH of the mixture from rising much above 7.0 since penicillin is somewhat unstable upon standing in alkaline solution. In this way there is obtained an aqueous solution of penicillin in the form of a soluble salt containing from 75 to 90 per cent or more of the active material present in the original unclarified fermentation brew. The aqueous solution may, if desired, be concentrated or it may be dried to produce a solid product having an activity of about 500 to 800 Oxford units of penicillin per milligram or it may, with advantage, be extracted under acid conditions, as previously described, with a water-immiscible organic liquid, e. g. with three successive portions of organic liquid each having a volume of about 10 per cent of that of the aqueous solution, and the penicillin-containing organic liquid then extracted with dilute aqueous alkali at a pH of about 7. In the latter extraction two or three successive portions of alkaline solution may be used, each of which may conveniently have a volume of from 5 to 10 per cent of that of the organic liquid from which penicillin is being extracted. The dry solid obtained by drying this latter aqueous extract has a penicillin content of from 800 to 1100 Oxford units per milligram when the process is carried out carefully. It has been noticed in connection with the last extraction with aqueous alkali that the product obtained by drying the first portion of the aqueous extract, i. e. that portion obtained when insufficient alkali is used to extract all of the penicillin from the organic liquid, has a somewhat higher degree of activity than the dry product prepared in similar manner but using sufficient alkali to extract substantially all of the penicillin from the organic liquid.

By using a water-immiscible organic liquid boiling below about 140° C. to extract penicillin from its aqueous solution, all traces of the liquid are volatilized during concentration or drying of the aqueous solution of the sodium salt of penicillin. By using a suitable alkaline sodium compound and dissolving it in pyrogen-free water and filtering the aqueous extract through a Seitz filter, both the sodium salt solution and the dry product are suitable for clinical use without further treatment.

Certain advantages of the invention are apparent from a comparison of the following examples in the first of which there is given a representative procedure of a heretofore recognized superior method for recovery of penicillin and in the second and third of which there are given procedures in accordance with the method of the present invention. These examples are given merely by way of illustration and are not to be construed as limiting.

*Example 1.—Comparison example*

Several hundred liters of an aqueous medium suitable for growth of *Penicillium notatum* was prepared. The medium was sterilized, inoculated with a pure culture of *Penicillium notatum* (NRRL strain No. 832) and incubated at 25°–26° C. for about 76 hours. The mixture was stirred and aerated during this time in conventional manner. At the end of the incubation period the brew contained about 100 Oxford units of penicillin per milliliter. Supercel was added to 100 liters of this brew at the rate of ten grams per liter, the mixture was stirred for 5 minutes, and filtered. The filter cake was washed with sufficient water (about 12 liters) to bring the volume of the combined filtrate and washings to 100 liters. This liquid was perfectly clear and contained about 88 Oxford units of penicillin per milliliter. The clear liquid was stirred for fifteen minutes with 1.5 kilograms of activated carbon, filtered in a press and the cake was washed in the press with ten liters of distilled water. The filtrate and washings were discarded.

The press cake was removed from the press and stirred for thirty minutes with a mixture of five liters of water and 1.87 liters of amyl acetate. The mixture was then filtered in a large Buchner funnel and the residue washed with sufficient water to bring the volume of the combined filtrate and washings to ten liters. The mixture filtered very slowly, about twelve hours being occupied in the filtering and washing operations. The washed residue was discarded. The ten liters of filtrate and washings contained forty per cent of the activity due to penicillin in the original 100 liters of clarified brew. The solution was then chilled at 0° C., agitated with 3.3 liters of amyl acetate, and the mixture acidified with dilute phosphoric acid to a pH of 2. After separating the amyl acetate layer from the water layer, the latter was extracted with two additional portions of 3.3 liters each of amyl acetate. The extraction operation was very slow due to the formation of emulsions which were difficult to separate. A clean separation was impossible and little aid was effected by attempting to filter the mixture. The combined extracts having a volume of ten liters were stirred with 166 milliliters of water and sufficient 2 per cent aqueous sodium bicarbonate solution added to raise the pH of the mixture to 7. After thorough agitation the layers were allowed to separate and the aqueous layer, which had a volume of about 400 milliliters, was drawn off. This layer contained about thirty-five per cent of the activity due to penicillin in the original 100 liters of clarified brew. A portion of the aqueous solution upon drying yielded a solid product having an activity of from 200 to 300 Oxford units of penicillin per milligram.

*Example 2*

An aqueous medium suitable for the growth of *Penicillium notatum* was prepared, inoculated and incubated as in Example 1. At the end of the incubation period the brew contained about 100 Oxford units of penicillin per milliliter. One hundred (100) liters of the brew was mixed with 200 liters of acetone and 1000 grams of Supercel was stirred into the mixture. The mixture was then filtered and the residue discarded. The filtration proceeded rapidly with no tendency of the filter to clog and the filtrate was perfectly clear and free of suspended matter. The filtrate was then distilled in vacuo the temperature in the still body being kept below about 45° C. One hundred five (105) liters of distillate were collected and used for diluting a subsequent 100 liters of brew. The 95 liters of still residue was a clear liquid containing very little acetone. The liquid was chilled to 0° C. and stirred vigorously with 10 liters of ethylene dichloride. Sufficient dilute phosphoric acid was added to the mixture during the agitation to lower the pH of the entire mixture to about 2. Stirring was continued for about twenty minutes and the mixture then allowed to separate into layers. The ethylene dichloride layer was drawn off and the acid aqueous layer extracted with 2 additional portions of 10 liters each of ethylene dichloride. The extracted aqueous liquid was then discarded.

The combined ethylene dichloride extracts were shaken with 1400 milliliters of water containing sufficient sodium bicarbonate to raise the pH of the entire mixture to 7. The mixture was allowed to separate into layers and the layers separated. The ethylene dichloride was reused in extracting penicillin from a subsequent still residue. The neutral aqueous layer contained about 90 to 95 per cent of the penicillin present in the original 100 liters of fermented brew. A portion of the aqueous solution of sodium salt was dried carefully. The resulting dry product contained about 500 Oxford units of penicillin per milligram. Similar results were obtained using *Penicillium chrysogenum* (NRRL strain No. 1951).

*Example 3*

In another determination 100 liters of brew was mixed with 200 liters of acetone, the acetone distilled and the still residue extracted with ethylene dichloride as in Example 2. The ethylene dichloride solution of penicillin, which had a volume of about 30 liters, was then extracted with three successive portions of a phosphate buffer solution having a pH of about 7. Each portion of the buffer solution had a volume of 3 liters. The combined aqueous extract, which had a volume of 9 liters, was then stirred vigorously with 0.9 liter of ethylene dichloride, sufficient phosphoric acid was added to lower the pH of the mixture to 2 and after stirring it for a few minutes longer the mixture was allowed to separate into layers and the ethylene dichloride layer drawn off. The aqueous layer was extracted with 2 additional 0.9 liter portions of ethylene dichloride and the ethylene dichloride extracts combined. The penicillin-containing ethylene dichloride was then extracted with two 100 milliliter portions of dilute aqueous sodium hydroxide each containing just enough alkali to raise the pH of the mixture to 7. The extracts were combined and the resulting aqueous solution of the sodium salt of penicillin had an activity of 40,000 Oxford units of penicillin per milliliter. A portion of the solution was dried and there was thus obtained a solid product containing about 800 Oxford units of penicillin per milligram.

The use herein of the terms "fermentation," "fermentation brew" and related terms to refer to the growing of microorganisms of the *Penicillium chrysogenum* series of molds in aqueous media, to the brew resulting from such growth, etc., is in entire keeping with the nomenclature and terminology which has arisen in the penicillin art wherein such processes and products are referred to regularly as fermentation processes and fermentation products. The terms are thus not confusing to those familiar with the art. Assay of penicillin-containing products referred to herein was accomplished by a modification of the Agar cup-plate method described in Circular 198 of the United States Department of Agriculture.

Although the method of the invention is of particular value in the recovery of penicillin from brews obtained by fermentation processes, it is apparent that the process is equally applicable to the recovery of penicillin from dilute aqueous solutions thereof containing penicillin-destroying enzymes regardless of the manner in which such solution is obtained.

I claim:

1. A process for the recovery of penicillin from an aqueous fermentation broth containing penicillin together with proteinaceous and penicillin-destroying enzymatic substances, obtained by cultivation of a penicillin-producing organism of the genus Penicillium on an aqueous nutrient medium, which comprises adding acetone to the fermentation broth in such amount that a substantial portion of the proteinaceous and enzymatic substances are precipitated, separating the precipitated matter from the aqueous acetone solution, and recovering the penicillin from the clarified aqueous acetone solution.

2. A process as defined in claim 1, in which the amount of acetone that is added is within the range of approximately 1 to approximately 2 volumes for each volume of the fermentation broth.

3. A process as defined in claim 1, in which the precipitated proteinaceous and enzymatic substances are separated from the aqueous acetone penicillin solution by filtration.

4. A process for the recovery of penicillin from an aqueous fermentation broth containing penicillin together with proteinaceous and penicillin-destroying enzymatic substances, obtained by cultivation of a penicillin-producing organism of the genus Penicillium on an aqueous nutrient medium, which comprises adding acetone to the fermentation broth in an amount within the range of approximately 1 to approximately 2 times the volume of the penicillin-containing fermentation broth, removing the precipitated proteinaceous and enzymatic substances by filtration, evaporating the acetone from the aqueous acetone filtrate and recovering the penicillin from the resulting aqueous solution by extraction with a water-insoluble organic solvent for penicillin.

5. A process as defined in claim 4, in which the water-insoluble organic solvent for penicillin is ethylene dichloride.

6. A process as defined in claim 4, in which the water-insoluble organic solvent is ethylene dichloride, the extraction is effected at a pH within the range from approximately 1.8 to approximately 2.5, and the penicillin is subsequently extracted from the organic solvent with an aqueous alkali at a pH of approximately 7.0.

GEORGE F. CARTLAND.

REFERENCES CITED

The following references are of record in the file of this patent:

UNITED STATES PATENTS

| Number | Name | Date |
|---|---|---|
| 1,929,003 | Neugebauer | Oct. 3, 1933 |
| 2,399,480 | Wachtel | May 7, 1946 |
| 2,424,832 | Koerber | July 29, 1947 |

FOREIGN PATENTS

| Number | Country | Date |
|---|---|---|
| 522,619 | Great Britain | Apr. 16, 1943 |

OTHER REFERENCES

Enzymes, Waksman et al., 1926, page 131.

Reid, Some Substances of a Bacterial Inhibitary Substance Produced by a Mold, Jr. Bact., 29; 215, 1935, pages 215–216.

Abraham et al., Nature, December 28, 1940, page 837.

British Journal of Experimental Pathology, vol. 23, June 1942, No. 3, pages 102–122.

Manufacturing Chemist and Manufacturing Perfumes, pages 251–254, August 1943.

Journal of Bacteriology, vol. 46, 1945, pages 187–202.

Pfizer Reports: "Purification of Penicillin."

Chemical Observation, "Recovery of Pencillin," pp. 1–3, Jan. 2, 1944, p. 2.

Pfizer Reports: Recovery of Penicillin, pp. 1–3, Jan. 2, 1944, p. 3.